United States Patent [19]

Yamamuro et al.

[11] Patent Number: 4,519,790
[45] Date of Patent: May 28, 1985

[54] HYDRAULIC CONTROL SYSTEM FOR CONTINUOUSLY VARIABLE V-BELT TRANSMISSION

[75] Inventors: Sigeaki Yamamuro, Zushi; Hiroyuki Hirano; Yoshiro Morimoto, both of Yokosuka; Yoshikazu Tanaka, Yokohama, all of Japan

[73] Assignee: Nissan Motor Company, Limited, Yokohama, Japan

[21] Appl. No.: 362,488

[22] Filed: Mar. 26, 1982

[30] Foreign Application Priority Data

Mar. 28, 1981 [JP] Japan ................. 56-44752

[51] Int. Cl.³ ............................. F16H 11/06
[52] U.S. Cl. ........................ 474/18; 474/28; 474/70
[58] Field of Search ............ 474/28, 17, 18, 70

[56] References Cited

U.S. PATENT DOCUMENTS

| 3,200,666 | 8/1965 | Schrodt et al. | 474/28 X |
| 3,596,528 | 8/1971 | Dittrich et al. | 474/28 X |
| 3,600,961 | 8/1971 | Rattunde et al. | 474/28 X |
| 4,056,015 | 11/1977 | Ludoph et al. | 474/28 |
| 4,161,894 | 7/1979 | Giacosa | 74/863 |
| 4,228,691 | 10/1980 | Smirl | 474/12 |
| 4,229,988 | 10/1980 | Rattunde | 474/28 |
| 4,304,150 | 12/1981 | Lupo et al. | 474/70 X |
| 4,387,608 | 6/1983 | Mohl et al. | 474/18 X |
| 4,403,975 | 9/1983 | Rattunde | 474/28 X |

FOREIGN PATENT DOCUMENTS

| 52356 | 10/1979 | Australia . | |
| 1256023 | 12/1967 | Fed. Rep. of Germany | 474/28 |
| 2703487 | 8/1977 | Fed. Rep. of Germany | 474/28 |
| 1229278 | 9/1960 | France | 474/28 |
| 2033502 | 5/1980 | United Kingdom | 474/28 |

*Primary Examiner*—Leslie A. Braun
*Assistant Examiner*—Dwight G. Diehl
*Attorney, Agent, or Firm*—Schwartz, Jeffery, Schwaab, Mack, Blumenthal & Koch

[57] ABSTRACT

A hydraulic control system disclosed herein comprises a line pressure regulator valve which regulates the fluid supplied from a pump to provide a line pressure variable at least depending upon output torque of the engine. The line pressure is supplied to a shift control valve which regulates the fluid supply to and discharge from cylinder chambers of drive and driven pulleys.

7 Claims, 14 Drawing Figures

HYDRAULIC CONTROL SYSTEM FOR CONTINUOUSLY VARIABLE V-BELT TRANSMISSION

BACKGROUND OF THE INVENTION

1. Field of the Invention

The present invention relates to a hydraulic control system for a continuously variable V-belt transmission.

2. Description of the Prior Art

As a control system for a conventional continuously variable V-belt transmission (hereinafter in the present specification called as "continuously variable transmission"), a hydraulic control system is known from Australian Pat. No. 52,356/79, which is shown in FIG. 1. Referring to FIG. 1, oil within a tank 201 is discharged into an oil conduit 204 by an oil pump 203 after passing through a filter 202 and supplied thereafter to a line pressure regulator valve 205. The line pressure provided after pressure regulation by the line pressure regulator valve 205 is supplied on one hand to a cylinder chamber 206a of a driven pulley 206 and on the other hand to a cylinder chamber 208a of a drive pulley 208 via a shift control valve 207. The shift control valve 207 feeds to the cylinder chamber 208a a predetermined oil pressure in response to balance between a rightwardly directed force created by a spring 210 resulting from rotatable movement of a throttle cam 209 and a leftwardly directed force produced by oil pressure from the oil conduit 211, thus controlling a shift between the drive pulley 208 and driven pulley 206. It is constructed and arranged such that the oil pressure responsive to revolution speed of the drive pulley 208 builds up in the oil conduit 211. The oil conduit 211 is connected also to the line pressure regulator valve 205 to create the leftwardly directed force in the line pressure regulator valve 205. To the line pressure regulator valve 205, an axial movement of the drive pulley 208 is transmitted via a rod 212, a lever 213, a slider 214 and a spring 215 such that a force increasing as the reduction ratio between the pulleys 208 and 206 increases is impressed upon the line pressure regulator valve 205. The line pressure regulator valve 205 is constructed and arranged such that an oil pressure is produced which increases as the rightwardly directed force increases and the leftwardly directed force decreases, so that the line pressure increases as the reduction ratio increases and the line pressure increases as the revolution speed of the drive pulley 208 decreases. That is, the line pressure is controlled in response to reduction ratio and revolution speed of the drive pulley.

However, since, as mentioned above, in a conventional continuously variable transmission, the line pressure is controlled only by reduction ratio and revolution speed of a drive pulley and has no connection with output torque of an engine, it is necessary to set the line pressure sufficiently high enough not to cause a slip between a V-belt and pulleys upon production of a maxmimum torque by an engine for the purpose of always ensuring a torque transmission capacity by the V-belt necessary from the range where the engine produces a small output to the range where the engine produces a large output. It therefore follows that the line pressure is higher than necessary when the output torque of the engine is low, thus applying an oil pressure higher than necessary to the V-belt, thus creating a problem in that the endurance of the V-belt drops and a problem in that an oil pump must be used which discharges such an unnecessarily highly pressurized oil. Besides, the power transmission efficiency of a V-belt gets worse as the difference between the maximum transmission capacity of the V-belt and the actual transmission drive increases, so that it is not desirable from the standpoint of efficiency either that the oil pressure is higher than necessary.

SUMMARY OF THE INVENTION

With a hydraulic control system according to the present invention, a line pressure regulator valve provides a line pressure variable depending at least upon output torque of the engine and means is connected to the line pressure regulator valve to receive the line pressure therefrom and for regulating fluid supply to and discharge from at least one of the cylinder chambers of the drive and driven pulleys.

With a hydraulic control system according to the present invention, a line pressure regulator valve regulates fluid from oil pumping means to provide a line pressure variable depending not only upon output torque of the engine, but also upon reduction ratio between drive and driven pulleys and means is connected to the line pressure regulator valve to receive the line pressure therefrom and for regulating fluid supply to and fluid discharge from both cylinder chambers of the drive and drive pulleys.

An object of the present invention is to provide a hydraulic control system for a continuously variable V-belt transmission wherein fluid pressure within each of cylinder chambers of drive and driven pulleys over which a V-belt runs is controlled optimum.

BRIEF DESCRIPTION OF THE DRAWINGS

The present invention is more specifically described in connection with the accompanying drawings, wherein.

DETAILED DESCRIPTION OF THE INVENTION

Hereinafter, the present invention will be explained along with FIGS. 2 through 4 of the accompanying drawings illustrating its embodiment.

Figure 1:
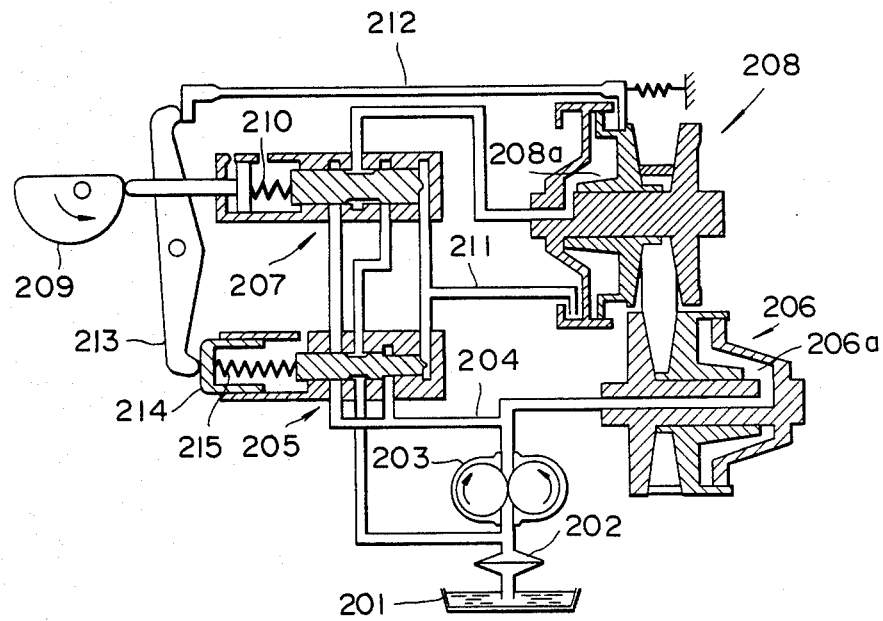
FIG. 1 is a diagrammatic view of a conventional hydraulic control system for a continuously variable V-belt transmission.
Figure 2:
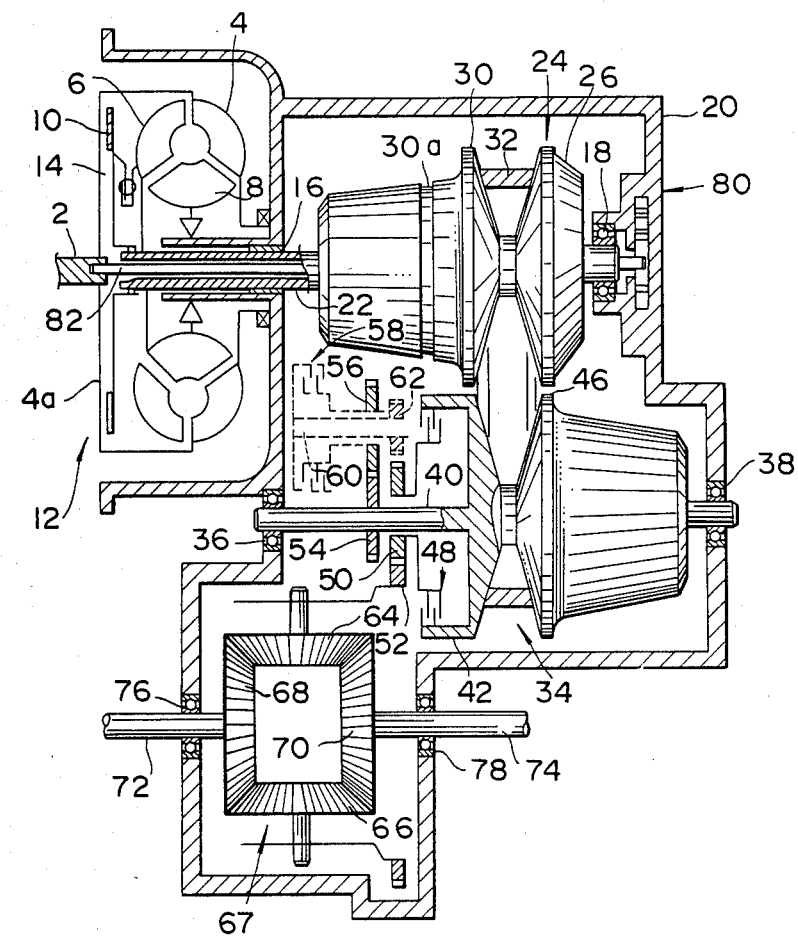
FIG. 2 is a diagrammatic view illustrating a power transmission mechanism of a continuously variable transmission.
Figure 3:
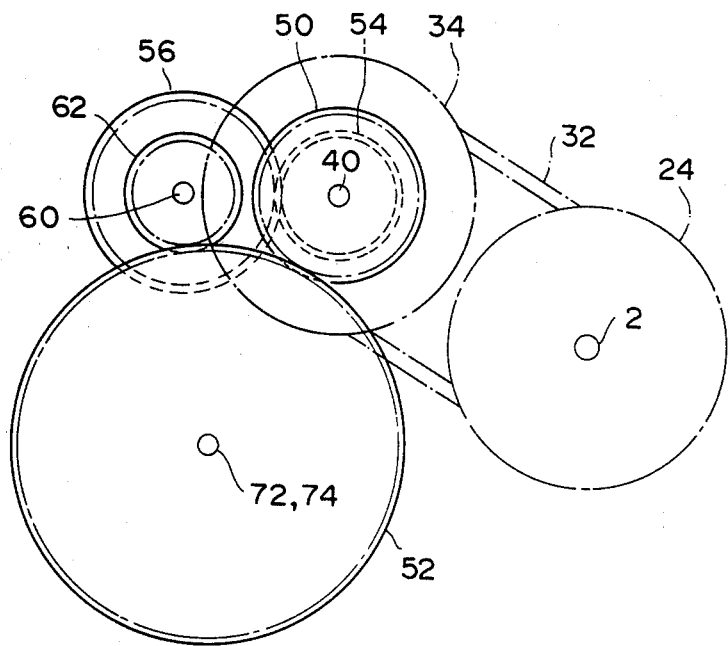
FIG. 3 is a layout of the shafts used in the continuously variable transmission shown in FIG. 2.

Firstly, a power transmission mechanism of a continuously variable transmission to which a control system according to the present invention is applied is illustrated in FIGS. 2 and 3.

Attached to an engine output shaft 2 rotatable in unison with a crankshaft of an engine (both not illustrated) is a torque converter 12 (which may be replaced with a fluid coupling) including a pump impeller 4, a turbine runner 6, a stator 8 and a lock-up clutch (lock-up device) 10. The lock-up clutch 10 is connected to the turbine runner 6 in an axially slidable manner and cooperates with a member (converter shell) 4a coupled with the engine output shaft 2 integral with the pump impeller 4 to define a lock-up clutch oil chamber 14 and operates such that when the oil pressure within the lock-up clutch oil chamber 14 becomes lower than that within the interior of the torque converter 12, this difference in oil pressure urges the lock-up clutch 10 to be pressed against the member 4a to come into a unitary rotation therewith. The turbine runner 6 is splined to one end of a drive shaft 22 which is rotatably supported by a case 20 via bearings 16 and 18. Arranged on the drive shaft 22 between the bearings 16 and 18 is a drive pulley 24. The drive pulley 24 comprises an axially fixed conical disc 26 and an axially movable conical disc 30 which is disposed to face the axially fixed conical disc 26 to define a V-shaped pulley groove therebetween and which is allowed to slide in an axial direction of the driven shaft 22 in response to an oil pressure created within a drive pulley cylinder chamber 28 (see FIG. 4). The drive pulley 24 is drivingly connected to a driven pulley 34 via a V-belt 32, this driven pully 34 being arranged on a driven shaft 40 which is rotatably supported by the case 20 via the bearings 36 and 38. The driven pulley 34 comprises an axially fixed conical disc 42 fixed to the driven shaft 40 and an axially movable conical disc 46 which is disposed to face the fixed conical disc 42 in such a manner as to define a V-shaped pulley groove and which is allowed to slide in an axial direction of the driven shaft 40 in response to an oil pressure created in a driven pulley cylinder chamber 44 (FIG. 4). The axially fixed conical disc 42 is drivingly connectable via a forward drive multiple disc clutch 48 to a forward drive gear 50 rotatably supported on the driven shaft 40, this forward drive gear being in mesh with a ring gear 52. Fixed to the driven shaft 40 is a reverse drive gear 54 which is in mesh with an idle gear 56. The idle gear 56 is drivingly connectable via a reverse drive multiple disc clutch 58 to an idle shaft 60 which has fixed thereto another idle gear 62 that is in mesh with the ring gear 52. (Although in FIG. 2 the idle gear 62, idle shaft 60 and reverse drive multiple disc clutch 58 are illustrated in positions displaced from the actually positions thereof for ease of illustration, the idle gear 62 and ring gear 52 are shown as out of mesh with each other, but, they are actually in mesh with each other as will be understood from FIG. 3.) The ring gear 52 has attached thereto a pair of pinion gears 64 and 66, output shafts 72 and 74 being coupled with side gears 68 and 70, respectively, which are in mesh with the pinion gears 64 and 66 to cooperate to form a differential 67, and the output shafts 72 and 74 which are supported via bearings 76 and 78, respectively, extending outwardly of the case 20 in the opposite directions. These output shafts 72 and 74 are connected to road wheels (not shown), respectively. In the drawing, there is arranged on the right side of the bearing 18 an oil pump 80 of the internally toothed gearing type which serves as a source of oil pressure, this oil pump 80 being driven by the engine output shaft 2 via an oil pump drive shaft 82 extending through the hollow driven shaft 22. Rotational power fed from the engine output shaft 2 to the continuously variable transmission, viz., a combination of torque converter with lock-up mechanism, continuously variable transmission mechansim and differential, is transmitted via torque converter 12, drive shaft 22, drive pulley 24, V-belt 32, driven pulley 34 to driven shaft 40 and in the case the forward multiple disc clutch 48 is engaged with the reverse drive multiple disc clutch 58 released, the rotation of the shaft 40 is transmitted via the forward drive gear 50, ring gear 52 and differential 67 to the output shafts 72 and 74 to rotate them in the forward rotational direction, whereas, in the case the reverse drive multiple disc clutch 58 is engaged with the forward drive multiple disc clutch released, the rotation of the shaft 40 is transmitted via the reverse drive gear 54, idle gear 56, idle shaft 60, idle gear 62, ring gear 52 and differential 67 to the output shafts 72 and 74 to rotate them in the reverse rotational direction. During this transmission of power, the rotation ratio between the drive pulley 24 and driven pulley 34 may be varied by moving the aixally movable conical disc 30 of the drive pulley 24 and the axially movable conical disc 46 of the driven pulley 34 in an axial direction so as to change the radii of the diameter contacting with the V-belt 32. For example, increasing the width of the V-shaped pulley groove of the drive pulley 24 and decreasing the width of the V-shaped pulley groove of the driven pulley 34 will cause a reduction in radius of the diameter of the drive pulley 24 contacting with the V-belt 32 and an increase in radius of the diameter of the driven pulley 34 contacting with the V-belt 32, resulting in an increase in reduction ratio. If the axially movable conical discs 30 and 46 are moved in the respective reverse directions, the reduction ratio is decreased. Depending upon power transmission circumstances, the torque converter serves as a torque multiplier or serves as a fluid coupling but, since it has the lock-up clutch 10 as attached to the turbine runner 6, the torque converter 12 can establish a direct mechanical connection between the engine output shaft 2 and driven shaft 22 when oil pressure is drained from the lock-up clutch oil chamber 14 to press the lock-up clutch 10 against the member 4a integral with the pump impeller 4.

Nextly, a hydraulic control system for the continuously variable transmission is explained. As shown in FIG. 4, the hydraulic pressure control system comprises an oil pump 80, line pressure regulator valve 102, a manual valve 104, shift ratio control valve 106, lock-up valve 108, shift motor 110, and a shift operating mechanism 112.

The oil pump 80 which is driven by the engine output shaft 2 as mentioned before discharges the oil within the tank 114 into the oil conduit 116. However, the oil pump drive shaft 82 is not illustrated in FIG. 4 for the sake of simplicity of illustration. The oil conduit 116 leads to ports 118a and 118c of the line pressure regulator valve 102 and the oil pressure therein will be regulated into a line pressure. The oil conduit 116 communicates with a port 120b of the manual valve 104 and a port 122c of the control valve 106.

The manual valve 104 has a valve bore 120 provided with five ports 120a, 120b, 120c, 120d and 120e, and a spool 124 formed with two lands 124a and 124b received in the valve bore 120, which spool 124 is actuated by a shift lever (not shown) between five detent positions "P", "R", "N", "D" and "L". The port 120a is permitted to communicate not only with a port 120d via an oil conduit 126, but also with a cylinder chamber 58a of the reverse drive multiple disc clutch 58. A port 120c is permitted to communicate not only with a port 120e by an oil conduit 130, but also with a cylinder chamber 48a of a forward drive multiple disc clutch 48. The port 120b communicates with the oil conduit 116 to receive line pressure therein. When the spool 124 is set in "P" position, the port 120b supplied with the line pressure is covered by a land 124b, so that the cylinder chamber 58a of the reverse drive multiple disc clutch 58 is drained via the oil conduit 126 and port 120d and the cylinder chamber 48a of the forward drive multiple disc clutch 48 are drained via the port 120e. When the spool 124 is set in "R" position, the port 120b is permitted to communicate with the port 120a by a groove between the lands 124a and 124b so as to permit the line pressure to communicate with the cylinder chamber 58a for the reverse drive multiple disc clutch 58, whereas, the cylinder chamber 48a of the forward drive multiple disc clutch 48 is left drained via the port 120e. When the spool 124 is set in "N" position, the port 120b is disposed between the lands 124a and 124b and is prevented from communicating with the other ports, thus the cylinder chamber 58a of the reverse drive multiple disc clutch 58 and the cylinder chamber 48a of the forward drive multiple disc clutch 48 are drained via the port 120a and port 120e in a similar manner to the case when the spool is in "P" position. When the spool 124 is set in "D" or "L" position, the port 120b is permitted to communicate with the port 120c via the groove between the port 120b and 120c so that the line pressure is supplied to the cylinder chamber 48a of the forward multiple disc clutch 48, whereas, the cylinder chamber 58a of the reverse drive clutch 58 is drained via the port 120a. Therefore, when the spool 124 is set in "P" position or "N" position, both the forward drive multiple disc clutch 48 and reverse drive multiple disc clutch 58 are released to interrupt the transmission of power, thus preventing the rotation of output shafts 72 and 74; when the spool 124 is set in "R" position, the reverse drive multiple disc clutch 58 is engaged so as to drive the output shafts 72 and 74 in the reverse rotational direction; when the spool 124 is set in "D" or "L" position, the forward drive multiple disc clutch 48 is engaged so as to drive the output shafts 72 and 74 in the forward rotational direction. Although there occurs no difference in the respect of a hydraulic circuit between "D" position and "L" position as mentioned above, both of the positions are electrically detected to actuate the shift motor 110 in such a manner as to effect a shift control in accordance with different shift patterns.

The line pressure regulator valve 102 comprises a valve bore 118 provided with five ports 118a, 118b, 118c, 118d and 118e, a spool 132 formed with five lands 132a, 132b, 132c, 132d and 132e, and springs 134 and 136 arranged on the both ends of the spool 132. It is to be noted that the lands 132a, and 132e provided on the both end portions of the spool 132 are smaller in diameter than the intermediate lands 132b, 132c and 132d. The left side spring 134 is disposed between the left end of the spool 132 and a throttle link 138, which throttle link 138 is urged for leftward movement as the throttle opening degree increases or for rightward movement as the throttle opening degree decreases. Therefore, if the throttle opening is great, the force created by the spring 134 urging the spool 132 rightwardly is small, whereas, if the throttle opening degree is small, the force by the spring 134 urging the spool rightwardly is great. A right side spring 136 is disposed between the right end of the spool 132 and a rod 140 cooperating with the axially movable conical disc 30 of the drive pulley 24. Therefore, if the axially movable conical disc 30 of the drive pulley 24 has moved rightwardly (viz., in the case a reduction ratio has decreased), the force by the spring 136 urging the spool 132 leftwardly decreases, whereas, if the axially movable conical disc 30 has moved leftwardly (viz., in the case a reduction ratio is increased), the force by the spring 136 urging the spool 132 leftwardly increases. As mentioned before, the ports 118a and 118c of the line pressure regulator valve 102 are supplied with the output oil discharged by the oil pump 80, the inlet to the port 118a being provided with an orifice 142. The port 118b is always drained, the port 118d is connected by an oil conduit 144 to an inlet port 146 of the torque converter and a port 150c of the lock-up valve 108, the port 118e communicates via an oil conduit 148 with the lock-up clutch oil chamber 14 within the torque converter 12 and with a port 150b of the lock-up valve 108. For preventing the application of an excessive pressure to the interior of the torque converter 12, the oil conduit 144 is provided with an orifice 145. Applied to the spool 132 of the line pressure regulator valve 102 are two forces in the rightward direction, one by the spring 134 and the other by the line pressure acting on a differential area between the lands 132a and 132b, and two forces in the leftward direction, one by the spring 136 and the other by the pressure at the port 118e acting upon a differential area between the land 132d and 132e, and the spool 132 adjusts the amount of drainage of the oil at the ports 118c via the port 118d and 118b (firstly the oil is drained via the port 118d into the oil conduit 144, and if it cannot afford the adjustment, the oil is drained via the port 118b, too), thus regulating the line pressure to balance the forces in the leftward and rightward directions. Therefore, the line pressure increases as the throttle opening degree increases, as a reduction ratio increases, and as the pressure at the port 118e (viz., the oil pressure building up within the lock-up clutch oil chamber 14) increases. (In this case, the torque converter 12 is in non lock-up state because the oil pressure in the chamber 14 is high.) The adjustment of the line pressure in this manner meets the actual demands, viz., the oil pressure must be increased to increase a force with which the pulleys are urged against the V-belt 32 so as to increase the torque transmission capacity which increases with increase in friction (this will be described later) because the output torque of the engine increases as the throttle opening degree increases and the multiplication of the torque increases as the reduction ratio increases and besides the oil pressure must be increased to increase the transmission torque to deal with the multiplication function of the torque by the torque converter 12 when it operates in a non lock-up state prior to lock-up.

Figure 4:
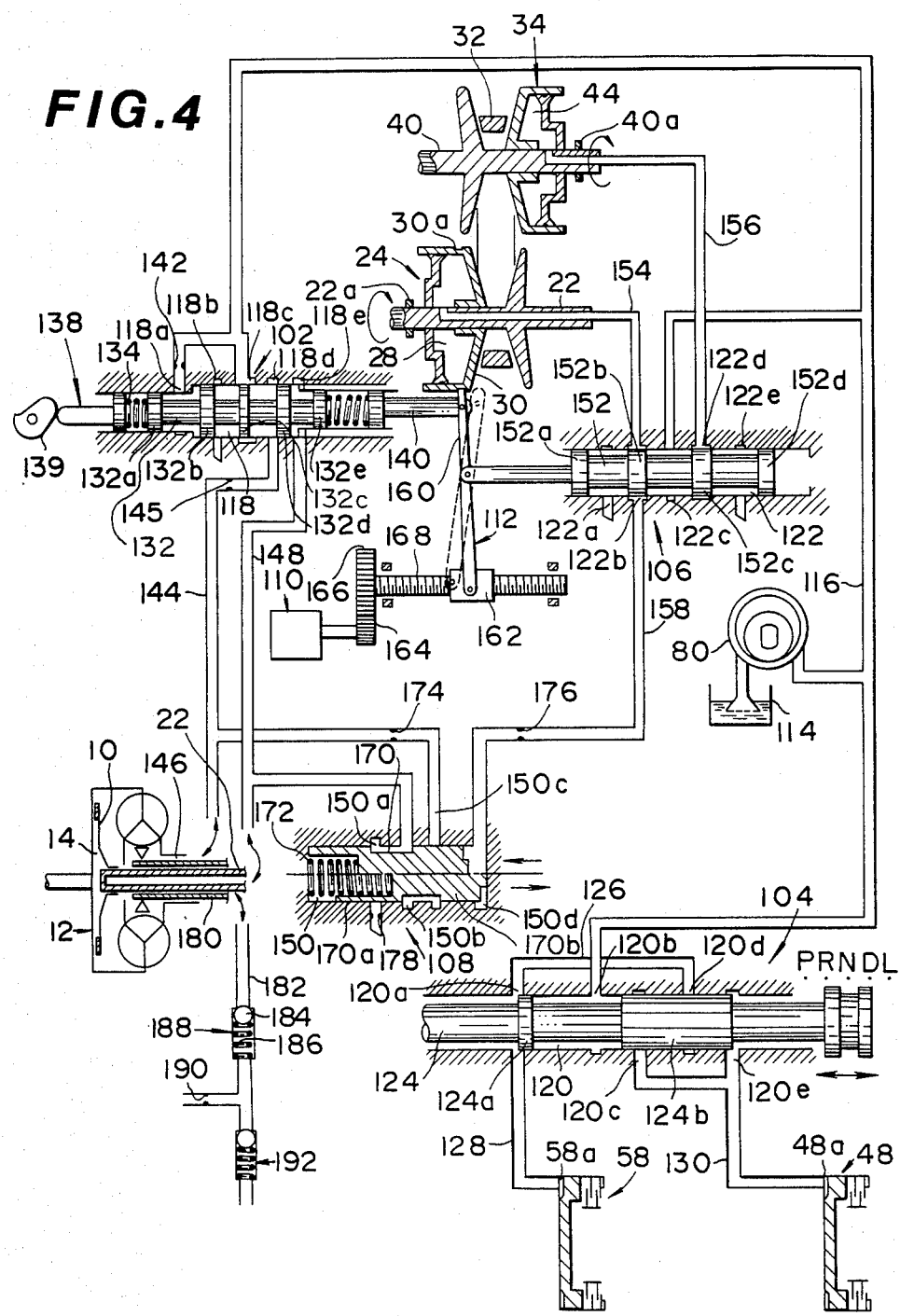
FIG. 4 is a hydraulic control system for the power transmission mechanism shown in FIG. 2.
Figure 5:
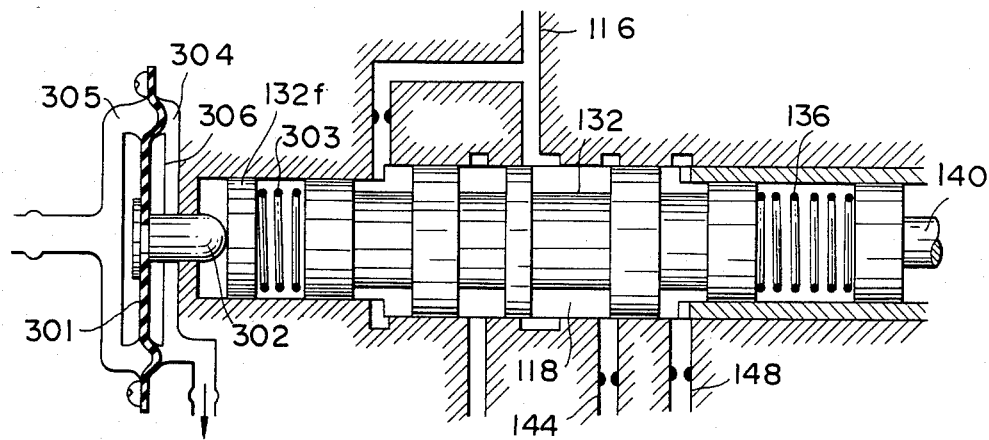
FIG. 5 is a diagrammatic view illustrating another line pressure regulator valve.

Although, in the embodiment illustrated in FIG. 4, the throttle cam 139 is used to detect engine output torque, a diaphragm 301 as shown in FIG. 5 may be used instead of the throttle cam to detect engine induction vacuum. Hereinafter, only that portions which are different from FIG. 4 are described by labelling them with different numerals. The diaphragm 301 has fixed thereto a diaphragm arm 302 between which and a spool 132 a return spring 303 is disposed. A plate 132f is slidable along a valve bore 118. The diaphragm 301 defines a vacuum chamber 304 on the right side and an atmosphere chamber 305 on the left side. A stop 306 is provided to prevent further movement of the diaphragm 301 beyond a predetermined stroke. The construction of the diaphragm allows an increase in rightwardly directed force acting upon the spool 132 as the engine vacuum increases and a decrease in the rightwardly directed force as the engine vacuum decreases, thus providing substantially the same function as that provided by said throttle cam 139.

The shift control valve 106 has a valve bore 122 formed with five ports 122a, 122b, 122c, 122d and 122e, and a spool 152 received in the valve bore 122 and formed with four lands 152a, 152b, 152c and 152d. The center port 122c communicates with the oil conduit 116 which is supplied with the line pressure, the left port 122b and right port 122d communicate via respective conduits 154 and 156 with the drive pulley cylinder chamber 28 of the drive pulley 24 and the driven pulley cylinder chamber 44 of the driven pulley 34. The port 122b communicates via an oil conduit 158 with a port 150d of the lock-up valve 108, too. Both of the end ports 122a and 122e are drained. The left end of the spool 152 is linked to a substantially middle portion of a lever 160 of the later-mentioned shift operating mechanism 112. The axial length of each of the lands 152b and 152c is slightly smaller than the width of the corresponding one of the ports 122b and 122d, whereas, the axial length between the lands 152b and 152c is substantially the same as the axial length between the ports 122b and 122d. Therefore, a portion of the line pressure supplied via the port 122c to the oil chamber between the lands 152b and 152c is allowed to pass through a clearance formed between the land 152b and the port 122b to flow into an oil conduit 154, but the remaining portion thereof is allowed to pass through another clearance formed between the land 152b and the port 122b to be drained, so that the pressure within the oil conduit 154 is determined depending upon the ratio between the areas of the above-mentioned clearances. In a similar manner, the pressure within the oil conduit 156 is determined depending upon the ratio of the areas of clearances formed between the edges of the land 152c and the port 122d. Therefore, if the spool 152 is disposed in the center position, the relationship of the land 152b with the port 122b becomes equal to that of the land 152c with the port 122d, thus causing the pressure in the oil conduit 154 to become equal to that in the oil conduit 156. As the spool 152 moves leftwardly, the clearance of the port 122b on the line pressure side increases and the clearance thereof on the drain side decreases, thus allowing the pressure in the oil conduit 154 to increase accordingly, whereas, the clearance of the port 122d on the line pressure side decreases and the clearance thereof on the drain side increases, thus causing the pressure in the oil conduit 156 to decrease accordingly. This causes an increase in pressure in the drive pulley cylinder chamber 28 of the drive pulley 24, resulting in a decrease in the width of the V-shaped pulley groove, and a reduction in pressure in the driven pulley cylinder chamber 44 of the driven pulley 34, resulting in an increase in the width of the V-shaped pulley groove, so that because the radius of the diameter of the drive pulley 24 contacting with the V-belt increases and the radius of the diameter of the driven pulley 34 contacting with the V-belt decreases, a reduction ratio decreases. Conversely, urging the spool 152 to move rightwardly causes the reverse action to that mentioned above to cause an increase in the reduction ratio.

The lever 160 of the shift operating mechanism 112, which lever is pin connected at its middle portion with the spool 152 of the shift control valve 106, has its one end received in an annular groove 30a formed in the axially movable conical disc 30 of the drive pulley 24 and has its opposite end pin connected with the sleeve 162. The sleeve 162 is internally threaded to mesh with the thread formed on the shaft 168 which is rotatable by the shift motor 110 via the gears 164 and 166. With this shift operating mechanism 112, if the shift motor 110 is rotated to rotate the shaft 168 via the gears 164 and 166 in one rotational direction to cause the sleeve 162 to move leftwardly, the lever 160 moves in a clockwise rotational direction with its end portion received by the annular groove 30a of the axially movable conical disc 30 of the drive pulley 24 as an fulcrum point, causing the leftward movement of the spool 152 connected to the lever 160 of the shift control valve 106. This causes a rightward movement of the axially movable conical disc 30 of the drive pulley 24 in a manner mentioned before to decrease the width of the V-shaped pulley groove, while, at the same time, the width of the V-shaped pulley groove of the driven pulley 34 increases, thus resulting in a reduction in the reduction ratio. Since the one end of the lever 160 is engaged with the groove 30a around the outer periphery of the axially movable conical disc 30, urging the axially movable conical disc 30 to move rightwardly will rotate the lever 160 clockwise with that end of the lever 160 which is pin connected with the sleeve 162 as a fulcrum. This causes the spool 152 to move back rightwardly, tending to render the drive pulley 24 and driven pulley 34 to assume the state accomplishing a low reduction ratio. This action causes the spool 152 and the drive pulley 24 and driven pulley 34 to assume a state accomplishing a reduction radio depending upon the amount of rotation of the shift motor 110. It goes the same if the shift motor 110 is rotated in the reverse direction. Therefore, if the shift motor 110 is actuated in accordance with a predetermined shift pattern, the reduction ratio varies accordingly, thus making it possible to control the shift in the continuously variable transmission by controlling the shift motor 110, alone.

The shift motor 110 is controlled by a control unit, not illustrated, which detects a revolution speed of the drive pulley 24 and a parameter indicative of the output torque of the engine, such as a throttle opening degree, wherein a desired value in engine revolution speed is determined using a predetermined function which defines for any value in the parameter indicative of the output torque of the engine a desired value in engine revolution speed. The control unit operates the shift motor to control the reduction ratio in such a manner as to maintain the revolution speed of the drive pulley in a predetermined relationship with the desired value in engine revolution speed. The control method and apparatus are described in co-pending U.S. application Ser. No. 362,489 entitled "METHOD AND APPARATUS FOR CONTROLLING CONTINUOUSLY VARIABLE V-BELT TRANSMISSION," filed concurrently with the present application by the same inventors and commonly assigned herewith, the disclosure of which application is hereby incorporated by reference in its entirety.

The lock-up valve 108 comprises a valve bore 150 formed with four ports 150a, 150b, 150c and 150d, a spool 170 having two lands 170a and 170b, and a spring 172 biasing the spool 170 rightwardly. The port 150d communicates with a port 122b of the shift control valve 106 through an oil conduit 158, the ports 150b and 150c communicate respectively through oil conduits 148 and 144 with the port 118e of the line pressure regulator valve 102 and the port 118d thereof, and the port 150a is drained. The oil conduits 144 and 158 and a drain oil conduit extending from the port 150a are provided with orifices 174, 176 and 178, respectively. The same oil pressure as that applied to the torque converter inlet port 146 is applied to the port 150c via the oil conduit 144, but when the oil pressure applied to the port 150d via the oil conduit 158 (the same oil pressure as that within the drive pulley cylinder chamber 28) is high enough as to press the spool 170 to the left against the force of the spring 172, the port 150c is blocked by the land 170b and the port 150b is drained via the port 150a. Therefore, the lock-up clutch oil chamber 14 which communicates with the port 150b via the oil conduit 148 is drained, thus permitting the lock-up clutch 10 to assume an engaged state by the pressure within the torque converter 12, rendering the torque converter to operate in lock-up state wherein the torque converter has no function as a torque converter. Conversely, if the oil pressure at the port 150d decreases to cause a leftwardly directed force to become smaller than a rightwardly directed force due to the spring 172, spool 170 moves rightwardly to a position wherein the port 150b is allowed to communicate with the port 150c. This causes the oil conduit 148 to communicate with the oil conduit 144, allowing the same oil pressure as that applied to the torque converter inlet port 146 to reach the lock-up clutch oil chamber 14, allowing the pressures on the both sides of the lock-up clutch 10 to become equal to each other, resulting in the release of the lock-up clutch 10. The orifice 178 is provided to prevent rapid drainage of the oil pressure from the lock-up clutch oil chamber 14 so as to alleviate a shock upon shifting into lock-up state, whereas, the orifice 174 is provided in the oil conduit 144 to permit a gradual increase in oil pressure within the lock-up oil chamber 14 so as to alleviate a shock upon release of the lock-up state. An orifice 176 is provided in an oil conduit 158 to prevent the occurrence of a chattering in the lock-up valve 108 owing to small variation in oil pressure in the drive pulley cylinder chamber 28.

The torque converter outlet port 180 communicates with the oil conduit 182 which is provided with a relief valve 188 including a ball 184 and a spring 186 and thus, with this relief valve, the pressure within the torque converter 12 is maintained at a constant pressure. The oil downstream of the relief valve 188 is introduced by an oil conduit 190 to an oil cooler and a lubricant circuit, both being unillustrated, and is finally drained, whereas, an excessive oil is drained by another relief valve 192, the thus drained oil being returned finally to a tank 114.

Hereinafter, an explanation is made as to the torque transmission capacity of a V-belt.

Transmission capacity of the V-belt is determined by a friction force between the V-belt and pulleys and may be expressed by an equation as follows:

$$T = 2Q \cdot \mu \cdot r / \cos \theta$$

Figure 6:
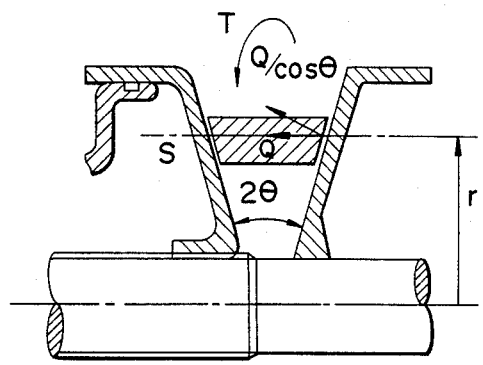
FIG. 6 is a diagram of the pulley and the V-belt.

T: Torque transmission capacity
Q: Bias force by pulley ($= P \cdot S$, wherein: P is an oil pressure within pulley cylinder chamber, S is a pressure acting area within the pulley cylinder chamber.)
$\mu$: Friction coefficient between V-belt and pulley
r: Running radius of V-belt
$\theta$: Apical angle of pulley groove (The above-mentioned values are diagrammatically illustrated in FIG. 6)

For ensuring that the V-belt does not slip upon transmitting output torque $T_E$ of engine, the amount of the drive pulley transmission torque capacity $T_1$ must satisfy the following equation.

$$T_E \leq T_1 = 2Q_1 \cdot \mu \cdot r_1 / \cos \theta$$

(In this equation, suffix 1 denotes drive pulley side. Suffix 2 which is used later denotes driven pulley side.)
Therefore, $$Q_1 \geq \frac{T_E \cdot \cos \theta}{2\mu \cdot r_1} \quad (1)$$

Since, on the driven pulley side, torque is increased by a reduction ratio $i\ (= r_2/r_1)$ between the drive and driven pulleys, the following equation can be obtained.

$$i \cdot T_E \leq T_2 = 2Q_2 \cdot \mu \cdot r_2 / \cos \theta$$

Thus;

$$Q_2 \geq \frac{i \cdot T_E \cdot \cos \theta}{2\mu \cdot r_2} = \frac{T_E \cdot \cos \theta}{2\mu \cdot r_1} \quad (2)$$

On the other hand, the following theoretical equation holds between $Q_1$, $Q_2$ and $r_1$, $r_2$.

$$\frac{Q_1}{\phi_1} \cdot \tan(\theta + \rho n) - \frac{Q_2}{\phi_2} \cdot \tan(\theta + \rho n) = \quad (3)$$

$$\frac{te}{2} \left[ 1 - \frac{1}{2} \left( \frac{\tan h(\lambda \cdot r_1 \cdot \phi_1)}{\lambda \cdot r_1 \cdot \phi_1} + \frac{\tan h(\lambda \cdot r_2 \cdot \phi_2)}{\lambda \cdot r_2 \cdot \phi_2} \right) \right]$$

te: Effective tensional force ($= T_E/r_1$)
$\rho n$: Friction angle at frictional power transmission portion ($= \tan^{-1} \mu n$) ($\mu n$ is a static frictional coefficient)
$\phi_1, \phi_2$: Contacting angle of V-belt with pulley groove $$\left( \cos \phi_1 = \frac{2(r_2 - r_1)}{L} \cdot \phi_1 + \phi_2 = 2\pi \right)$$

L: Distance between axises of drive and driven pulleys
$\lambda$: Shift characteristic value of V-belt $$\left( = \sqrt{\frac{h \cdot G}{\omega \cdot A \cdot E}} \right)$$

(h: Height of the contacting portion of V-belt,
ω: Width of V-belt,
A: Cross sectional area of V-belt,
G: Rigidity coefficient,
E: Young's modulus )

If the bias force $Q_1$ by the drive pulley is the minimum critical value $Q_{1a}$, it can be expressed as $$Q_{1a} = \frac{T_E \cdot \cos\theta}{2\mu \cdot r_1}$$

Substituting it for $Q_2$ in the equation (3), driven pulley bias force $Q_{2a}$ by the driven pulley can be expressed as $$Q_{2a} = \frac{\phi_2}{\phi_1} \cdot Q_{1a} - \frac{\phi_2 \cdot T_E}{2r_1 \cdot \tan(\theta + \rho n)} \left[ 1 - \tfrac{1}{2} \left( \frac{\tan h(\lambda \cdot r_1 \cdot \phi_1)}{\lambda \cdot r_1 \cdot \phi_1} + \frac{\tan h(\lambda \cdot r_2 \cdot \phi_2)}{\lambda \cdot r_2 \cdot \phi_2} \right) \right]$$

Figure 7:
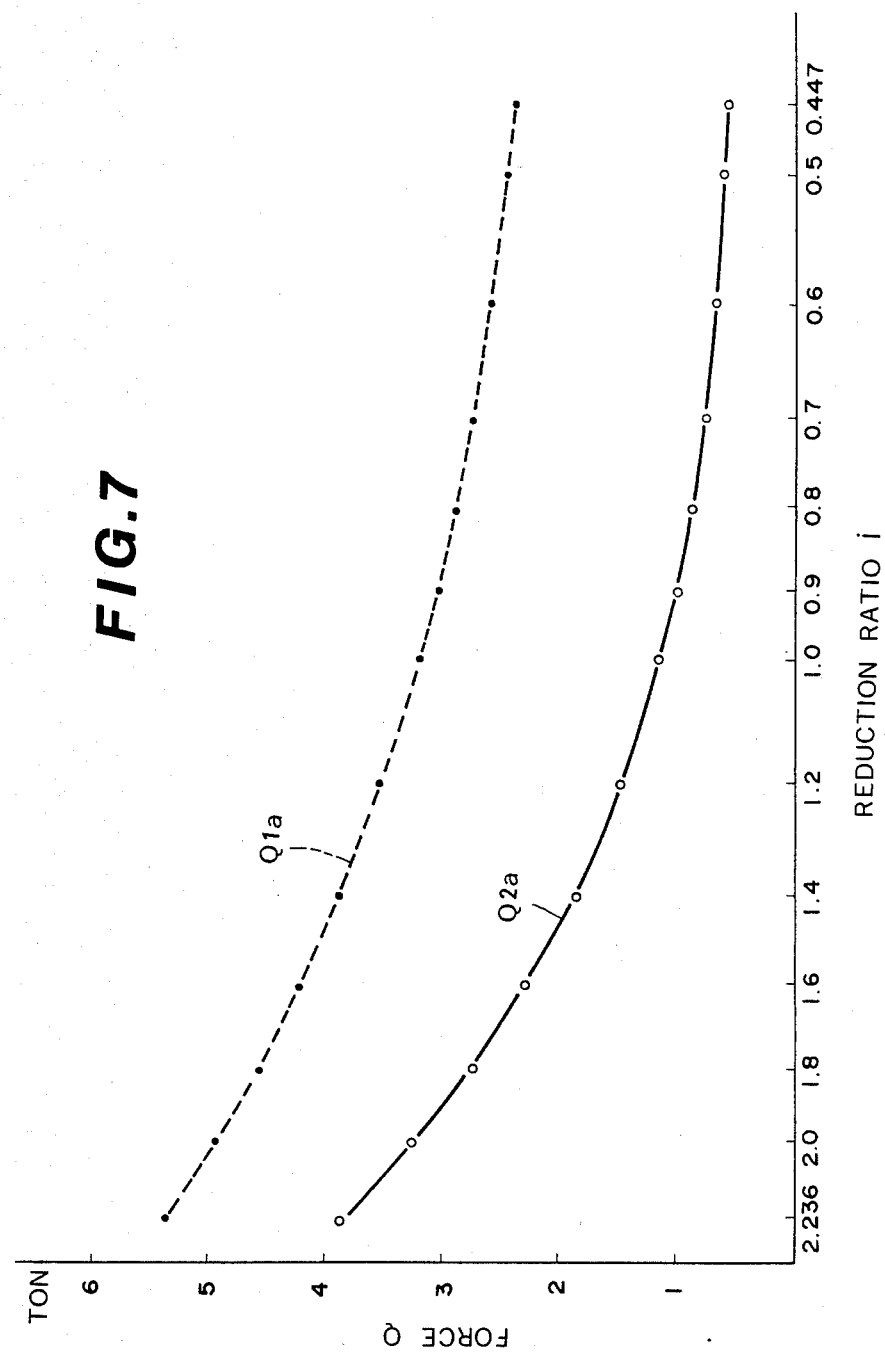
FIGS. 7 and 8 illustrate bias force by pulley vs., reduction ratio characteristic curves.

Calculating the actual values for the above-mentioned $Q_{1a}$, $Q_{2a}$ if L=150 mm and the minimum running radius of a V-belt is 30.5 mm, we obtain the values plotted in FIG. 7, and $Q_{1a} > Q_{2a}$ holds over the actual range in reduction ratio. However, it is understood from the equation (2) that the driven pulley slips owing to insufficiency in capacity unless $$Q_{2a} \geq \frac{T_E \cdot \cos\theta}{2\mu \cdot r_1} \; (= Q_{1a}),$$

this condition is not satisfied when $Q_{1a} > Q_{2a}$. Therefore, if the bias force by drive pulley on the V-belt is set to its minimum crictical value, the driven pulley slips.

Conversely, the bias force $Q_2$ by the driven pulley on the V-belt is set to its minimum critical value $Q_{2b}$ as expressed in the equation (2), then $$Q_{2b} = \frac{T_E \cdot \cos\theta}{2\mu \cdot r_1} \tag{4}$$

Substituting this for $Q_2$ in the equation (3), the bias force $Q_{1b}$ by the drive pulley is expressed as follows:

$$Q_{1b} = \frac{\phi_1}{\phi_2} \cdot Q_{2b} + \frac{\phi_1 \cdot T_E}{2r_1 \cdot \tan(\theta + \rho n)} \left[ 1 - \tfrac{1}{2} \left( \frac{\tan h(\lambda \cdot r_1 \cdot \phi_1)}{\lambda \cdot r_1 \cdot \phi_1} + \frac{\tan h(\lambda \cdot r_2 \cdot \phi_2)}{\lambda \cdot r_2 \cdot \phi_2} \right) \right] \tag{5}$$

Figure 8:
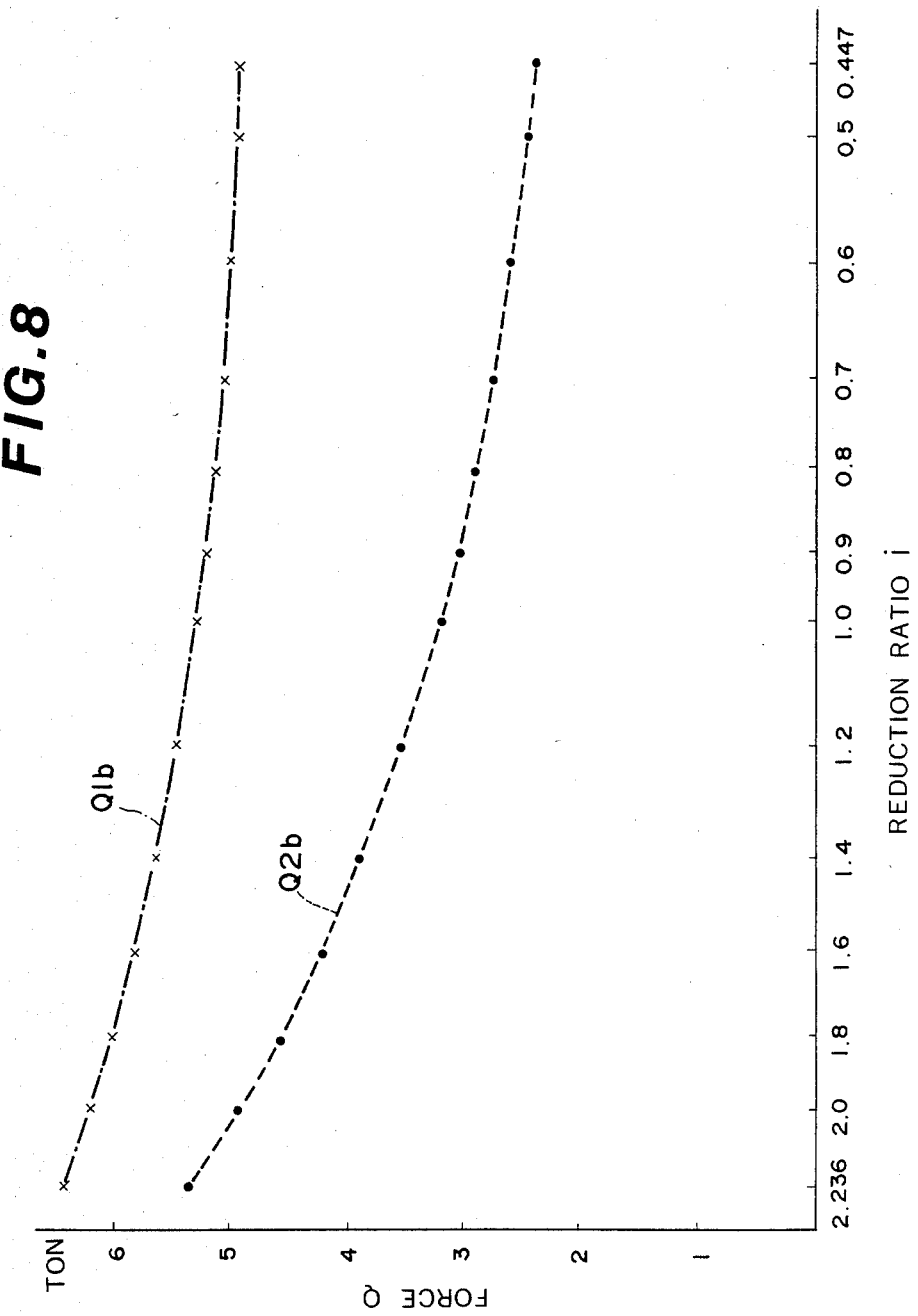

Similarly to the above-mentioned manner, actual values of $Q_{2b}$, $Q_{1b}$ are obtained, they can be plotted as shown in FIG. 8 and $Q_{1b} > Q_{2b}$ holds, thus satisfying always the equation (1), preventing the driven pulley from slipping.

It will now be understood that in order to set the bias force by the pulley on the V-belt to a value high enough to bias the pulley to the V-belt effeciently and without causing the V-belt not to slip, the bias force by the drive pulley is to be set to its minimum critical value and the bias force by the driven pulley be set to a corresponding force which is necessary for shifting operation (this force is necessarily larger than the minimum critical value.).

Assuming that pressure acting areas of the drive and driven pulley cylinder chambers are $S_1$, $S_2$, respectively, oil pressure values $P_1$, $P_2$ necessary within the drive and driven pulley cylinder chambers are $$P_1 = Q_{1b}/S_1$$

$$P_2 = Q_{2b}/S_2$$

Therefore, line pressure should be equal to or a little higher than a higher one of $P_1$ and $P_2$. Since the values of $P_1$ and $P_2$ vary as $S_1$ and $S_2$ vary, the explanation is made hereinafter to each of the possible cases.

Figure 9:
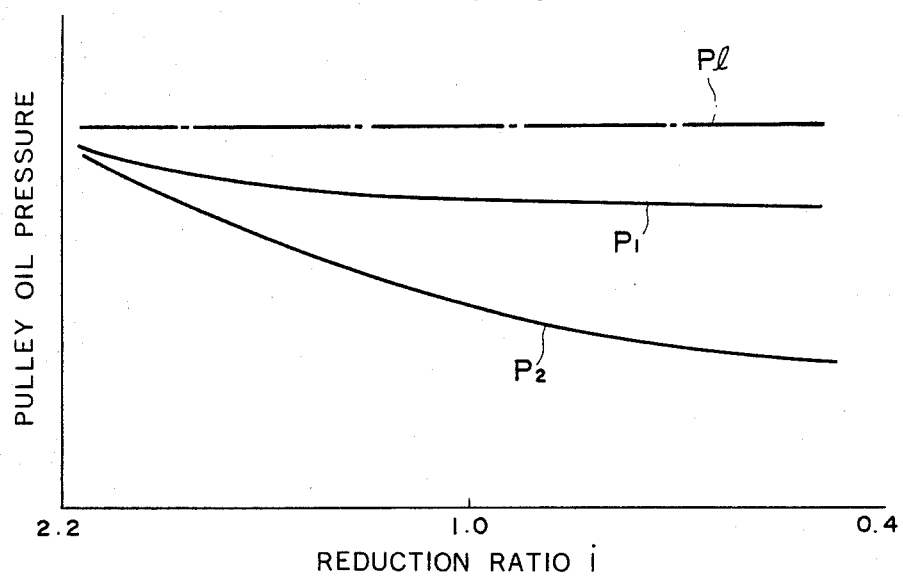
FIGS. 9 through 11 illustrate pulley oil pressure vs., reduction ratio characteristic curves.
Figure 14:
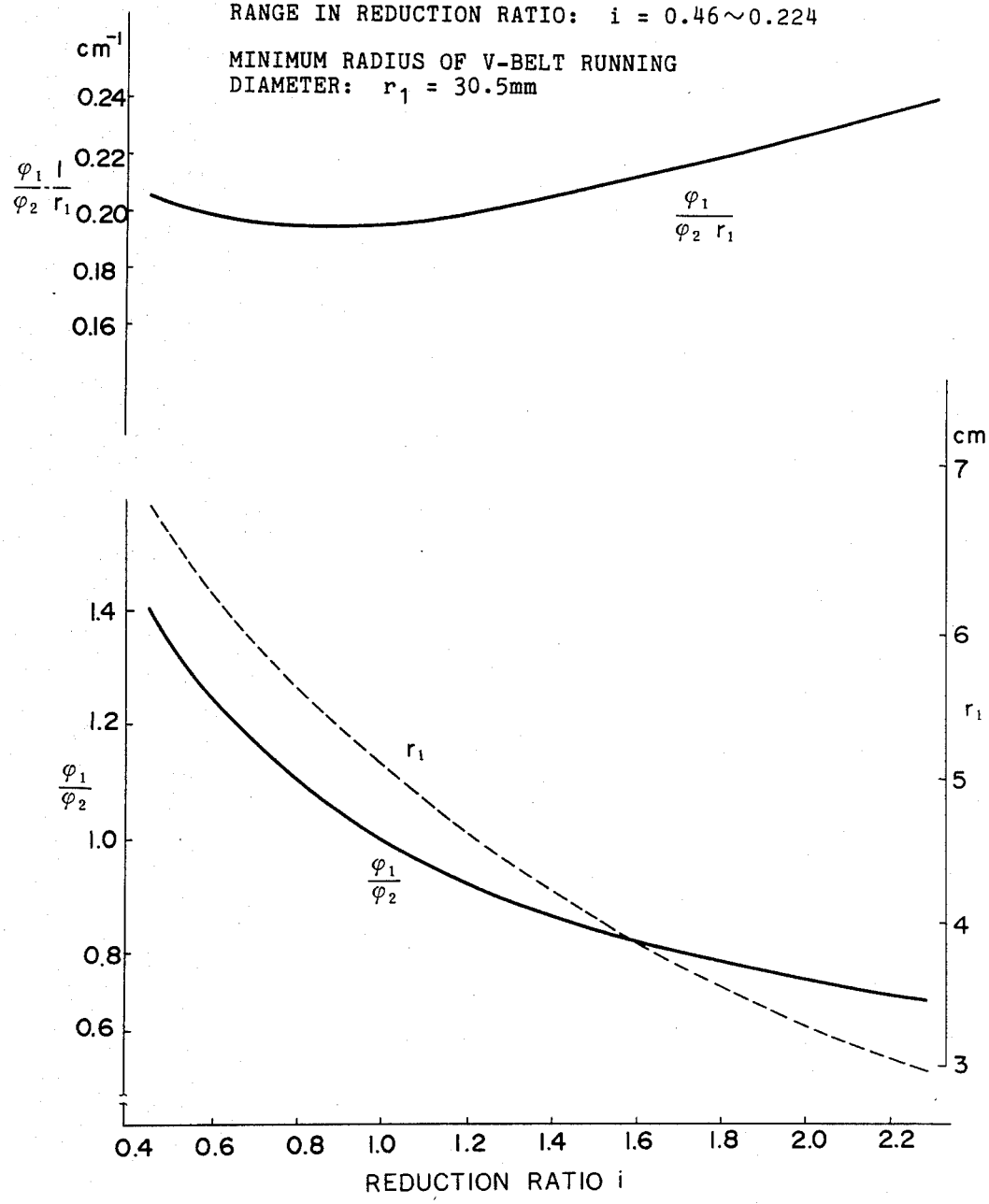
FIG. 14 shows how $(\phi_1/\phi_2)\cdot(1/r_1)$ varies against variation in reduction ratio.

In the case $S_1$ is substantially equal to $S_2$, since $P_1 > P_2$, line pressure P1 should be equal to or a little higher than $P_1$. This relationship can be illustrated in FIG. 9. The reason that the line pressure P1 is set a little higher than $P_1$ results from due consideration of a safety against variation in the line pressure. As in this case the effect of the second term in the equation (5) is negligible and small, the equation can be expressed as $Q_{1b} \approx \phi_1/\phi_2 \cdot Q_{2b}$. From the equation (4) $Q_{2b} \sim 1/r_1$. Thus, $Q_{1b}$ can be expressed as $\phi_1/\phi_2 \cdot 1/r_1$. As will be understood from FIG. 14, $\phi_1/\phi_2 \cdot 1/r_1$ is substantially constant irrespective of variation in reduction ratio. Thus, it can be said that $Q_{1b}$ is substantially constant. Since $Q_{1b}$ is substantially constant, $P_1$ is not affected by variation in reduction ratio as readily understood from FIG. 9 and thus is substantially constant. Therefore, the line pressure can be set constant irrespective of variation in the reduction ratio and thus what is necessary is to control the line pressure dependent upon the output torque of the engine only.

Figure 10:
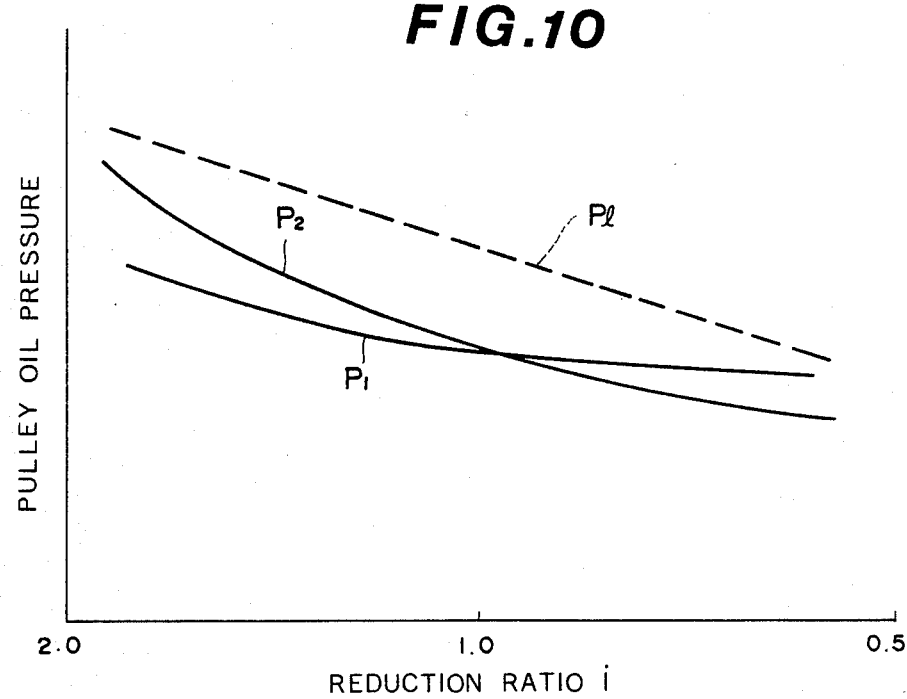

In the case wherein $S_1$ is greater than $S_2$, if they are set to satisfy $S_1/S_2 \approx Q_{1b}/Q_{2b}$, $P_1 \approx P_2$ and thus $P_1$ and $P_2$ vary as shown in FIG. 10 depending upon the variation in reduction ratio. Therefore, if the line pressure P1 is reduced as the reduction ratio reduces, the line pressure P1 can be maintained always slightly higher than $P_1$, $P_2$, thus providing very efficient control.

Figure 11:
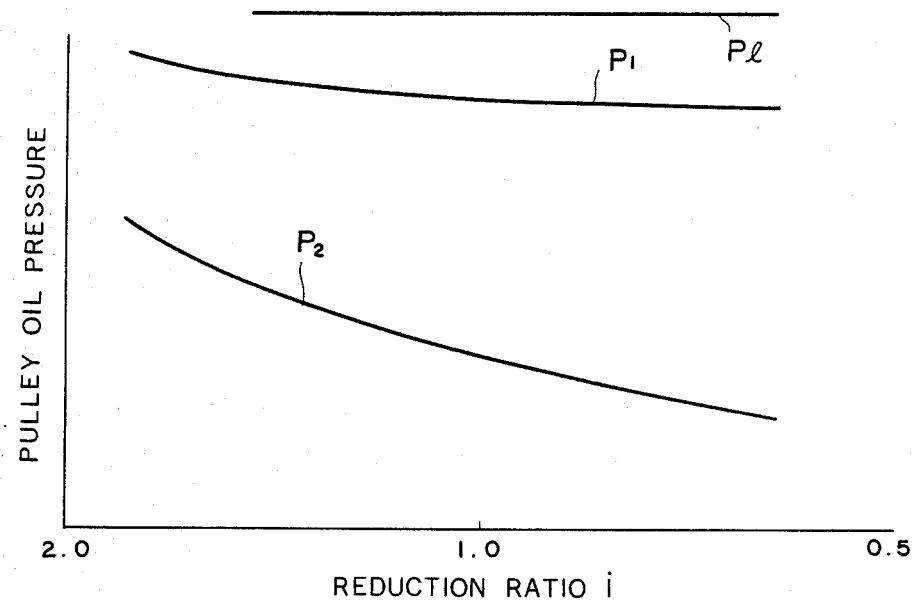

Subsequently, if $S_1$ is smaller than $S_2$, $P_1$ and $P_2$ vary as shown in FIG. 11 and $P_1$ increases considerably high, but since the line pressure must be set higher than $P_1$, this case is not preferrable from the standpoint of appropriate setting of the line pressure.

It will therefore be understood that the appropriate setting of the line pressure can be made by controlling the line pressure to vary in proportion to the output torque of the engine, if the pressure acting area $S_1$ of the drive pulley cylinder chamber is substantially equal to the pressure acting area $S_2$ of the driven pulley cylinder chamber, and by controlling the line pressure to vary in proportion to the output torque of the engine and also to reduction ratio if the pressure acting area $S_1$ is larger than the pressure acting area $S_2$.

Although, in FIG. 4, the line pressure regulator valve 102 controls the line pressure in response to the output torque of the engine (throttle opening) and reduction ratio, the regulator valve may be readily modified to control the line pressure in proportion only to the output torque of the engine by eliminating the rod 140 that is provided for transmission of the motion of the movable conical disc 30 of the driven pulley to prevent the spring from varying its load in response to the reduction ratio.

Figure 12:
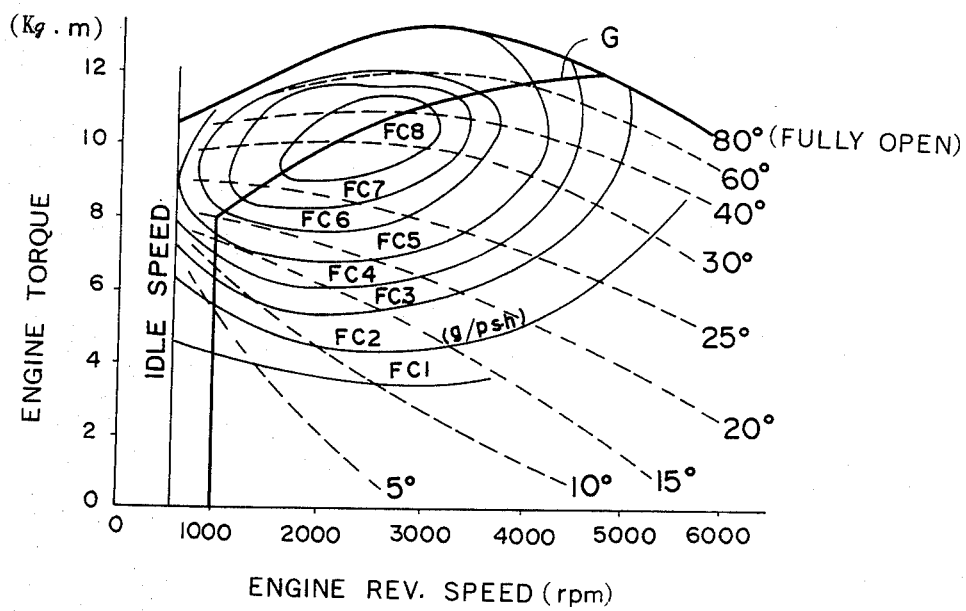
FIG. 12 is a performance characteristic of an engine used with the continuously variable V-belt transmission shown in FIG. 2 showing engine troque vs., engine revolution speed characteristic curves, shown by the broken line, each curve for any value in throttle opening degree, isofuel consumption rate curves FC1 through FC8 and a minimum fuel consumption rate curve G shown by the bold solid line.
Figure 13:
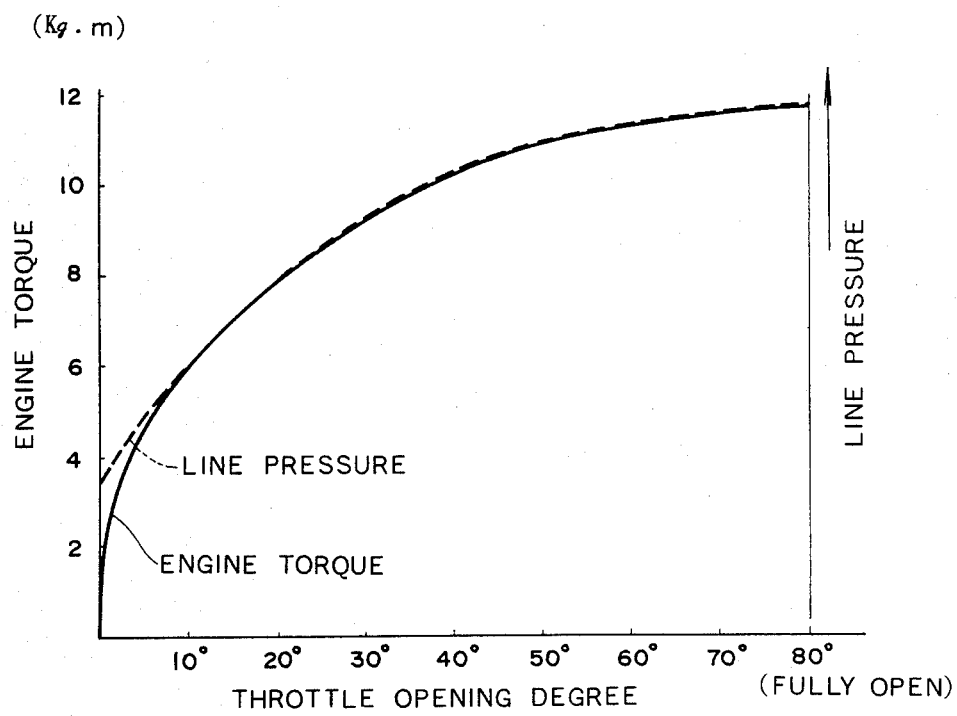
FIG. 13 illustrates engine torque vs., throttle opening degree characteristic curve and line pressure vs., reduction ratio characteristic curve.

Description is now made as to one example of the control of line pressure which is adjusted in response to the output torque of the engine. Although, in usual cases, it is the practice to set the line pressure corresponding to the maximum torque against any given throttle opening degree, there may occur a case that it is not required to set the line pressure corresponding to the maximum torque against any given throttle opening degree because in the shift control of a continuously variable transmission, a range in engine revolution speed against any given output torque of the engine is narrow, thus the output torque of the engine is limited within a predetermined range. For example, performance curves of the engine are illustrated in FIG. 12 wherein the abscissa axis represents the revolution speed of the engine and the ordinate axis engine torque, and their relationship at various throttle opening degrees are illustrated and isofuel consumption rate curves are illustrated. In this diagram, the best fuel consumption rate curve G as shown by the bold line is obtained by interconnecting the best fuel consumption rate point on each of the engine torque vs., engine revolution speed curve. If the engine is controlled on this best fuel consumption rate curve, the fuel consumption rate is made minimum. In this case, the engine torque is fixedly determined against any given value of the throttle opening degrees. Expressing this best fuel consumption rate curve on a graph having its abscissa axis representing the throttle opening degree and the ordinate axis representing the engine torque result in a solid curve shown in FIG. 13. Therefore, the most effecient setting of the line pressure is obtained only by designing the configuration of the throttle cam 139 so that the line pressure varies along with this curve. The variation of the line pressure thus set is shown by a chain line curve. The reason that the line pressure is not 0 is that the oil pressure for the pulley is required upon engine braking even if the throttle opening is zero. Apparently, the magnitude of this line pressure may be selected by appropriately selecting the configuration of the stop 306 (this may be replaced with a spring) or that of the throttle cam 139.

As previously described, according to the present invention, fluid supplied to at least one of cylinder chambers of drive and driven pulleys is controlled to vary depending upon at least output torque of the engine by means of a line pressure regulator valve for providing a V-belt with transmission torque high enough for the output torque of the engine so as to apply always the optimum force to the V-belt, thus resulting in enhancement in endurance of the V-belt and in power transmission efficiency. Furthermore, it is no longer necessary for the oil pump to discharge pressurized oil higher than necessary, thus preventing the occurrence of damage on the part of the oil pump, thus making contribution to the effect of providing durable and high effecient continuously variable transmission.

What is claimed is:

1. A hydraulic control system for a continuously variable V-belt transmission having a V-belt running over a drive and a driven pulley, each having a cylinder chamber and two conical discs, one conical disc of the drive pulley being secured to a drive shaft adapted to be driven by an engine, one conical disc of the driven pulley being secured to a driven shaft, the other conical disc of the drive pulley being controllably movable in an axial direction of the drive shaft in response to a fluid pressure in the cylinder chamber thereof, the other conical disc of the driven pulley being controllably movable in an axial direction of the driven shaft in response to a fluid pressure in the cylinder chamber thereof, said hydraulic control system comprising:
pumping means for the hydraulic fluid; and
a line pressure regulator valve means connected to said pumping means for regulating the output of the fluid supplied to said line pressure regulating valve means by said pumping means, said line pressure regulator valve means generating a variable output line pressure which is responsive to the position of a spool within the line pressure regulator valve means, wherein the position of said spool is dependent upon continuous inputs from both the output torque of the engine and the reduction ratio between the drive and driven pulleys.

2. A hydraulic control system as claimed in claim 1, wherein a pressure acting area of the cylinder chamber of the drive pulley is substantially equal in area to a pressure acting area of the cylinder chamber of the driven pulley.

3. A hydraulic pressure control system as claimed in claim 1, wherein a pressure acting area of the cylinder chamber of the drive pulley is larger in area than a pressure acting area of the cylinder chamber of the driven pulley.

4. A hydraulic control system for a continuously variable V-belt transmission having a V-belt running over a drive pulley and a driven pulley, at least one of the drive and driven pulleys having a cylinder chamber, each having two conical discs, one conical disc of the drive pulley being secured to a drive shaft adapted to be driven by an engine, one conical disc of the driven pulley being secured to a driven shaft, the other conical disc of the drive pulley being controllably movable in an axial direction of the drive shaft in response to a fluid pressure in the cylinder chamber, the other conical disc of the drive pulley being controllably movable in an axial direction of the driven shaft in response to the fluid pressure in the cylinder chamber, said hydraulic control system comprising:
a pump delivering the fluid;
a line pressure regulator valve including means defining a valve bore formed with a plurality of ports including a drain port and a pressure port connected to said pump, a spool with a plurality of lands slidably disposed in said valve bore to control fluid flow from said pressure port to said drain port, a first spring biasing said spool in one direction so as to cause said spool to decrease the fluid flow from said pressure port to said drain port, a second spring biasing said spool against said first spring, means responsive to a predetermined signal indicative of an output torque of the engine for decreasing a bias force of said second spring as the output torque of the associated engine increases, and means responsive to a reduction ratio between the drive pulley and the driven pulley for increasing a bias force of said first spring as the reduction ratio becomes large; and
a shift control valve means connected to said high pressure port of said line pressure regulator valve for regulating fluid supply to and fluid discharge from the cylinder chamber.

5. A hydraulic control system as claimed in claim 4, wherein said means responsive to the reduction ratio is operatively connected to the other conical disc of the drive pulley for increasing the bias force of the first spring as the other conical disc of the drive pulley displaces away from the one conical disc of the drive pulley.

6. A hydraulic control system as claimed in claim 4, wherein said means responsive to the predetermined signal indicative of the output torque of the engine includes a throttle cam operatively connected to a throttle valve for the engine.

7. A hydraulic control system as claimed in claim 4, wherein said means responsive to the predetermined signal indicative of the output torque of the engine includes a diaphragm device having a vacuum chamber communicating with an intake manifold of the engine.

* * * * *